United States Patent
Hansen et al.

(10) Patent No.: US 10,508,643 B2
(45) Date of Patent: Dec. 17, 2019

(54) TOOL AND A METHOD FOR MOVING A WIND TURBINE DRIVETRAIN COMPONENT

(71) Applicant: Vestas Wind Systems A/S, Aarhus N. (DK)

(72) Inventors: Erland Falk Hansen, Morke (DK); Morten Mogensen, Bramming (DK); Mads Damgaard, Lystrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 242 days.

(21) Appl. No.: 14/360,191

(22) PCT Filed: Nov. 15, 2012

(86) PCT No.: PCT/DK2012/050418
§ 371 (c)(1),
(2) Date: May 22, 2014

(87) PCT Pub. No.: WO2013/075717
PCT Pub. Date: May 30, 2013

(65) Prior Publication Data
US 2014/0334908 A1    Nov. 13, 2014

Related U.S. Application Data

(60) Provisional application No. 61/567,858, filed on Dec. 7, 2011.

(30) Foreign Application Priority Data

Nov. 25, 2011    (DK) .................................. 2011 70648

(51) Int. Cl.
*F03D 13/10*    (2016.01)
*F03D 80/50*    (2016.01)
(Continued)

(52) U.S. Cl.
CPC .............. *F03D 13/10* (2016.05); *B23P 6/002* (2013.01); *F03D 15/00* (2016.05); *F03D 80/50* (2016.05);
(Continued)

(58) Field of Classification Search
CPC ............ F05B 2230/50; F05B 2230/604; F05B 2230/608; F05B 2230/61; F05B 2230/70;
(Continued)

(56) References Cited

U.S. PATENT DOCUMENTS 6,232,673 B1    5/2001    Schoo et al.
7,644,482 B2    1/2010    Albers et al.
(Continued)

FOREIGN PATENT DOCUMENTS

DE    102010016840 A1    11/2011
EP    1101936 A2    5/2001
(Continued)

OTHER PUBLICATIONS

Translation of EP2146090, generated Nov. 23, 2015.*
(Continued)

*Primary Examiner* — Matthew P Travers
(74) *Attorney, Agent, or Firm* — Wood Herron & Evans LLP

(57) ABSTRACT

The invention provides a tool for moving a drivetrain component in a nacelle of a horizontal axis wind turbine, the nacelle comprising a nacelle structure, the component being connected, in operation of the wind turbine, to a rotor of the wind turbine, the tool comprising at least drive unit for moving the component in relation to the nacelle in a direction parallel to the rotational axis of the rotor, and a plurality of position adjustment devices adapted to be located between the nacelle structure and the component, and distributed so that rotational movement of the component can
(Continued)

be provided by coordinated control of the position adjustment devices.

15 Claims, 6 Drawing Sheets

(51) Int. Cl.
    *F03D 15/00*     (2016.01)
    *B23P 6/00*     (2006.01)
    *B66F 3/24*     (2006.01)
    *B66F 3/26*     (2006.01)
    *B66F 3/46*     (2006.01)

(52) U.S. Cl.
    CPC ............... *B66F 3/247* (2013.01); *B66F 3/26* (2013.01); *B66F 3/46* (2013.01); *F05B 2230/60* (2013.01); *F05B 2230/604* (2013.01); *F05B 2230/80* (2013.01); *F05B 2240/14* (2013.01); *F05B 2250/40* (2013.01); *Y02E 10/726* (2013.01); *Y02P 70/523* (2015.11)

(58) Field of Classification Search
    CPC ............... F05B 2230/80; Y10T 29/37; Y10T 29/49316; Y10T 29/49318; Y10T 29/49819; Y10T 29/49998; Y10T 29/53539–53548; Y10T 29/53961; Y10T 29/53974; Y10T 29/53978; Y10T 29/53983; F03D 1/001; F03D 1/003; F03D 1/005; B23P 6/002; B23P 11/00; B23P 19/04; B23P 19/10; B66F 3/247; B66F 3/26; B66F 3/46; B66F 7/10–16; B66F 3/24; B66F 7/22; B66F 7/28; B66F 5/00; B66F 9/06; B66D 3/18–3/26; B66D 2700/025
See application file for complete search history.

(56) References Cited

U.S. PATENT DOCUMENTS

| | | | |
|---|---|---|---|
| 7,735,808 | B2 | 6/2010 | Viladomiu i Guarro et al. |
| 7,944,079 | B1 | 5/2011 | Signore |
| 8,500,400 | B2 * | 8/2013 | Signore .................. B66C 1/108 29/893.1 |
| 2006/0148612 | A1 | 7/2006 | Albers et al. |
| 2006/0226106 | A1 * | 10/2006 | Zaguroli, Jr. ............ B66D 3/18 212/331 |
| 2007/0200103 | A1 | 8/2007 | Viladomiu i Guarro et al. |
| 2009/0084658 | A1 * | 4/2009 | Quintana .................. B60L 8/003 198/602 |
| 2010/0062888 | A1 | 3/2010 | Ciszak et al. |
| 2010/0275442 | A1 | 11/2010 | Ohl, Jr. |
| 2012/0110816 | A1 * | 5/2012 | Groves ..................... B62B 3/10 29/428 |

FOREIGN PATENT DOCUMENTS

| | | |
|---|---|---|
| EP | 1291521 A1 | 3/2003 |
| EP | 2146090 A2 | 1/2010 |
| EP | 2791499 B1 | 1/2017 |
| GB | 2074661 A | 11/1981 |
| JP | 2011163119 A | 8/2011 |
| SE | 428042 B | 5/1983 |
| WO | 2009074859 A2 | 6/2009 |

OTHER PUBLICATIONS

Translation of JP2011163119, generated May 8, 2018.*
International Searching Authority, International Search Report and Written Opinion issued in corresponding PCT Application No. PCT/DK2012/050418 dated May 27, 2013, 10 pages.
Danish Patent and Trademark Office, Combined search and examination report issued in corresponding DK application No. PA 2011 70648 dated Jul. 6, 2012, 4 pages.
European Patent Office, European Search Report in EP Application No. 16194100, dated Feb. 9, 2017.

* cited by examiner

TOOL AND A METHOD FOR MOVING A WIND TURBINE DRIVETRAIN COMPONENT

TECHNICAL FIELD

The invention relates to a tool for moving a drivetrain component in a nacelle of a horizontal axis wind turbine.

BACKGROUND

A number of solutions have been suggested for handling wind turbine gearboxes, generators and other drivetrain components, e.g. at service or installation, see for example U.S. Pat. No. 6,232,673, EP1291521, SE428042, EP1101936, U.S. Pat. Nos. 7,735,808, 7,644,482 and US2010062888. U.S. Pat. No. 7,944,079 describes sleds for moving a gearbox in a direction parallel to the rotor rotational axis. WO2009074859 describes a system for moving wind turbine main components in a nacelle, in a direction parallel to the rotor rotational axis, with a rail underneath the components. The system comprises a transport device with height adjustment and lateral adjustment.

Although known solutions provide some means of controlling the position of drivetrain components when mating them at service or installation, it would be useful to improve this control.

SUMMARY

It is an object of the invention to improve the handling of drivetrain components when moving them in horizontal axis wind turbines. Another object is to improve the control of drivetrain components when moving them in horizontal axis wind turbines.

These objects are reached with a tool for moving a drivetrain component in a nacelle of a horizontal axis wind turbine, the nacelle comprising a nacelle structure, the component being connected, in operation of the wind turbine, to a rotor of the wind turbine, the tool comprising
- at least one drive unit for moving the component in relation to the nacelle in a direction parallel to the rotational axis of the rotor, and
- a plurality of position adjustment devices adapted to be located between the nacelle structure and the component, and distributed so that rotational movement of the component can be provided by coordinated control of the position adjustment devices.

The rotational control of the components greatly improves the control for alignment of mating or cooperating components during installation of drivetrain components, which in modern wind turbines can be very large and heavy, weighing for example over 30 tons. The rotational control will be very useful for service of such heavy components including alignment of bolt holes and of male and female shaft parts. It should be noted that the drivetrain component can be any type of wind turbine drivetrain component, such as a generator, gearbox or mainshaft, or an assembly of such components. It should also be noted that the rotation of the component is preferably effected when the component is separated from the rotor or other drivetrain components, e.g. by means of the drive unit.

The position adjustment devices can be actuators, e.g. hydraulic or electric linear actuators. The coordinated control of the position adjustment devices can take many different forms of combinations of actuations, e.g. one or more of the position adjustment devices effect movements in one direction while one or more of the position adjustment devices effect movements in the other direction, and/or one or more of the position adjustment devices are kept still while others effect movements.

Preferably, at least two of the position adjustment devices are distributed in a direction parallel to the rotational axis of the rotor so that the attitude of the component in relation to the nacelle can be controlled by means of said at least two position adjustment devices. It should be noted that the locations of said at least two position adjustment devices do not necessarily have to be aligned with the rotor axis; instead they can be at different distances from the rotor axis, but they are in this embodiment separated in a direction of the rotor axis. A more general embodiment can be described as follows: In a space defined by an x-axis that is parallel to the rotational axis of the rotor, a y-axis that is horizontal and perpendicular to the x-axis, and a z-axis that is perpendicular to the x-axis and to the y-axis, for control of the rotational position of the component around an axis that is parallel to the y-axis, at least two of the position adjustment devices are distributed in a sub-space defined by the x-axis and the z-axis.

Preferably, at least two of the position adjustment devices are distributed in a direction parallel to an axis that is horizontal and perpendicular to the rotor axis, so that the rotational position of the component, in relation to the nacelle, around an axis that is parallel to the rotational axis of the rotor can be controlled by means of the position adjustment devices. Again, it should be noted that the locations of said at least two position adjustment devices do not necessarily have to be aligned with said axis that is horizontal and perpendicular to the rotor axis; instead they can be at different distances from said axis, but they are in this embodiment separated in a direction of the said axis. A more general embodiment can be described as follows: In a space defined by an x-axis that is parallel to the rotational axis of the rotor, a y-axis that is horizontal and perpendicular to the x-axis, and a z-axis that is perpendicular to the x-axis and to the y-axis, for the control of the rotational position of the component around an axis that is parallel to the x-axis, at least two of the position adjustment devices are distributed in a sub-space defined by the y-axis and the z-axis.

The position adjustment devices can be adapted to act directly onto the component or the nacelle structure, or alternatively onto intermediate parts, such as a part of a transport assembly including the drive unit. In a preferred embodiment, the position adjustment devices comprises a plurality of first position adjustment devices adapted to act between a respective first location on the nacelle structure or on an intermediate part, and a respective second location on the component or on an interface portion positioned between the component and the respective first position adjustment device, the second location being higher than the first location. Thus, as opposed to hanging, the component rests on top of the first position adjustment devices. Thus, the first position adjustment devices can each be arranged to be subjected to a compression force when carrying at least a part of the weight of the component. The first position adjustment devices can be linear actuators, e.g. hydraulic or electric linear actuators.

In some embodiments, a form of "yaw adjustment" is provided as follows: At least two of the position adjustment devices are second position adjustment devices and, in a space defined by an x-axis that is parallel to the rotational axis of the rotor, a y-axis that is horizontal and perpendicular to the x-axis, and a z-axis that is perpendicular to the x-axis and to the y-axis, the second position adjustment devices that are distributed in a sub-space defined by the x-axis and the y-axis so that the rotational position of the component in relation to the nacelle and the z-axis can be controlled by means of the second position adjustment devices. Preferably, there are at least four second position adjustment devices, located in pairs distributed along the y-axis and on either side of the component, and where the second position adjustment devices of each pair are distributed along the x-axis. Preferably, the second position adjustment devices are each adapted to provide a force between the component and the nacelle structure, which force is parallel to, or has a component in, the plane defined by the x-axis and the y-axis. By providing such a force of diagonally oppositely located second position adjustment devices, the component can be caused to rotate around the z-axis.

Preferably, the tool comprises at least one transport assembly including at least one of said at least one drive unit, and at least two of said position adjustment devices. This provides an easily controlled solution for combined translational and rotational movements of the component. Preferably, the transport assembly comprises a sled to which at least one of the at least one drive unit is connected, which sled is adapted to slide on the nacelle structure or a part, e.g. a support unit, adapted to be fixed to the nacelle structure. Preferably, the tool comprises two transport assemblies each comprising a drive unit, the transport assemblies being distributed along a horizontal axis the is perpendicular to the rotor rotational axis and located on either side of the component, two position adjustment devices being located on each transport assembly and are distributed along the rotor rotational axis.

The objects are also reached with a method for moving a drivetrain component in a nacelle of a horizontal axis wind turbine, the nacelle comprising a nacelle structure, the component being connected, in operation of the wind turbine, to a rotor of the wind turbine, the method comprising placing at least one vehicle, for example a sled or a cart with wheels, between the component and the nacelle structure, connecting a drive unit between the nacelle structure and the vehicle, or between the nacelle structure and the component or a part fixed to the component, connecting at least two position adjustment devices between the vehicle and the component, moving the component along the rotor rotational axis by means of the drive unit, and rotating the component by means of the position adjustment devices.

The objects are also reached with a tool according to claim 16.

DESCRIPTION OF THE FIGURES

Below, an embodiment of the invention will be described with reference to the drawings in which.

DETAILED DESCRIPTION

Figure 1:
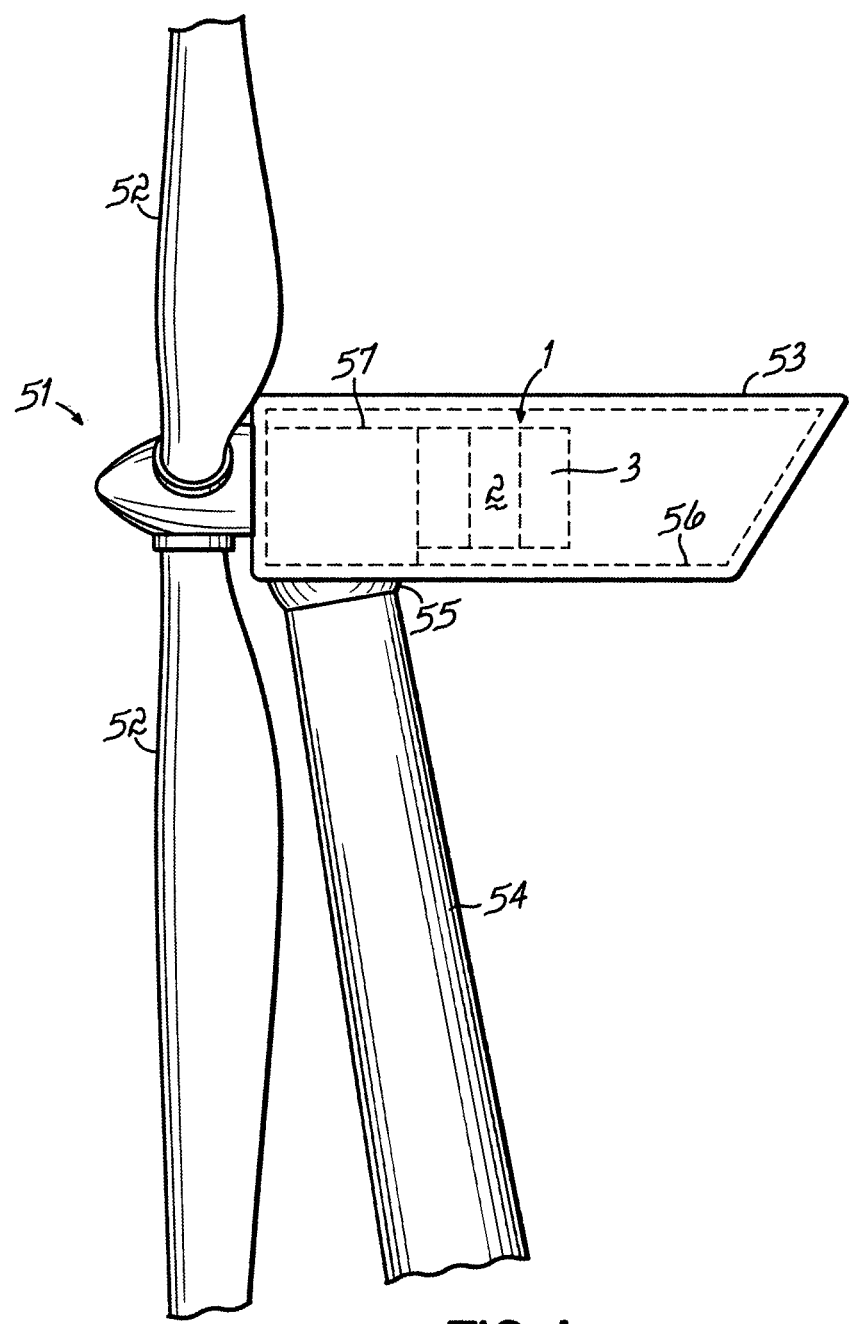
FIG. 1 is a sideview of parts of a wind turbine with some hidden parts indicated with broken lines.

FIG. 1 is a sideview of parts of a horizontal axis wind turbine comprising a rotor 51, with three blades 52, a nacelle 53 to which the rotor is rotatably mounted and which in turn is mounted on top of a tower 54. The nacelle comprises a nacelle structure including a bedframe 55 rotatably mounted on the tower for yawing, and a nacelle frame 56 connected to the bedframe 55. The rotor is mounted to a mainshaft (not shown) which is rotatably mounted to a mainshaft housing 57 which in turn is fixed to the bedframe 55. The wind turbine further comprises a drivetrain component 1 in the form of an assembly of a gearbox 2 and a generator 3 in the nacelle 53. It should be noted that for this presentation, the generator is considered as a drivetrain component.

Figure 2:
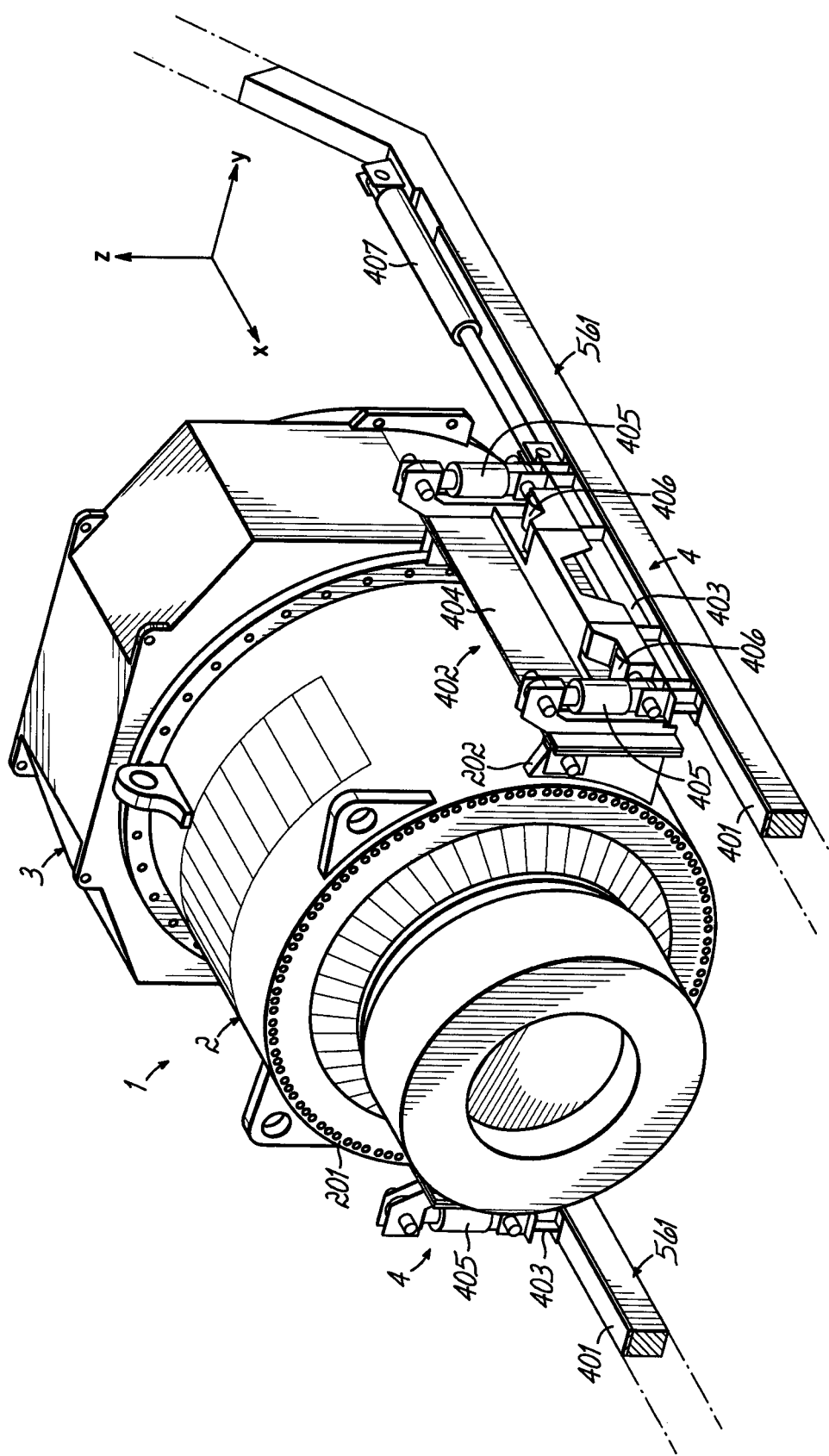
FIG. 2 is a perspective view of a tool according to one embodiment of the invention with a drivetrain component.

FIG. 2 shows the component 1 disassembled from other drive components such as a main shaft (not shown), which is in the operational state of the wind turbine connecting the gearbox and a rotor of the wind turbine, which rotor comprises at least one blade. In the operational state (FIG. 1), the stationary housing of the gearbox 2 is connected to the main shaft housing 57 by means of a flange 201 on the gearbox 2, a cooperating flange on the main shaft housing and bolts connecting the flanges. Since the main shaft housing 57 is mounted on the bedframe 55, the gearbox 2 and the generator 3 are in the mounted state cantilevered from the main shaft housing 57, and connected to the nacelle structure 55, 56 via the main shaft housing 57. As is known in the art, alternatively the gearbox 2 and the generator 3 can have respective direct connections to the nacelle structure 55, 56.

For this presentation, a nacelle fixed coordinate system (see FIG. 2) is defined as follows: The x-axis is parallel to the rotational axis of the wind turbine rotor, the y-axis is horizontal and perpendicular to the x-axis, and the z-axis that is perpendicular to the x-axis and to the y-axis. (In most horizontal axis wind turbines the rotor axis is inclined, e.g. 10 degrees, to a horizontal plane, and in such a turbine, the x-axis as defined above would of course also be inclined.)

A tool 4 for moving the drivetrain component 1 in the nacelle comprises two supporting units 401 mounted to a respective longitudinal member 561 of the nacelle structure. The support units 401 are elongated, oriented parallel to the x-axis, and distributed along the y-axis so as to be located on either side of the component 1 in the mounted state thereof. Further in this embodiment the support units 401 are located at a lower portion of the component in the mounted state thereof, and have the shape of flanges 401 protruding from the respective longitudinal member 561 of the nacelle structure.

The tool 4 further comprises two transport assemblies 402 each arranged so as to cooperate with a respective of the support units 401 and thus similarly located on either side of the component 1. Each transport assembly 402 comprises a vehicle in the form of a sled 403, an interface portion 404 for connection to the component, two first position adjustment devices 405, and two second position adjustment devices 406. Each transport assembly 402 also comprises a drive unit 407.

Figure 3:
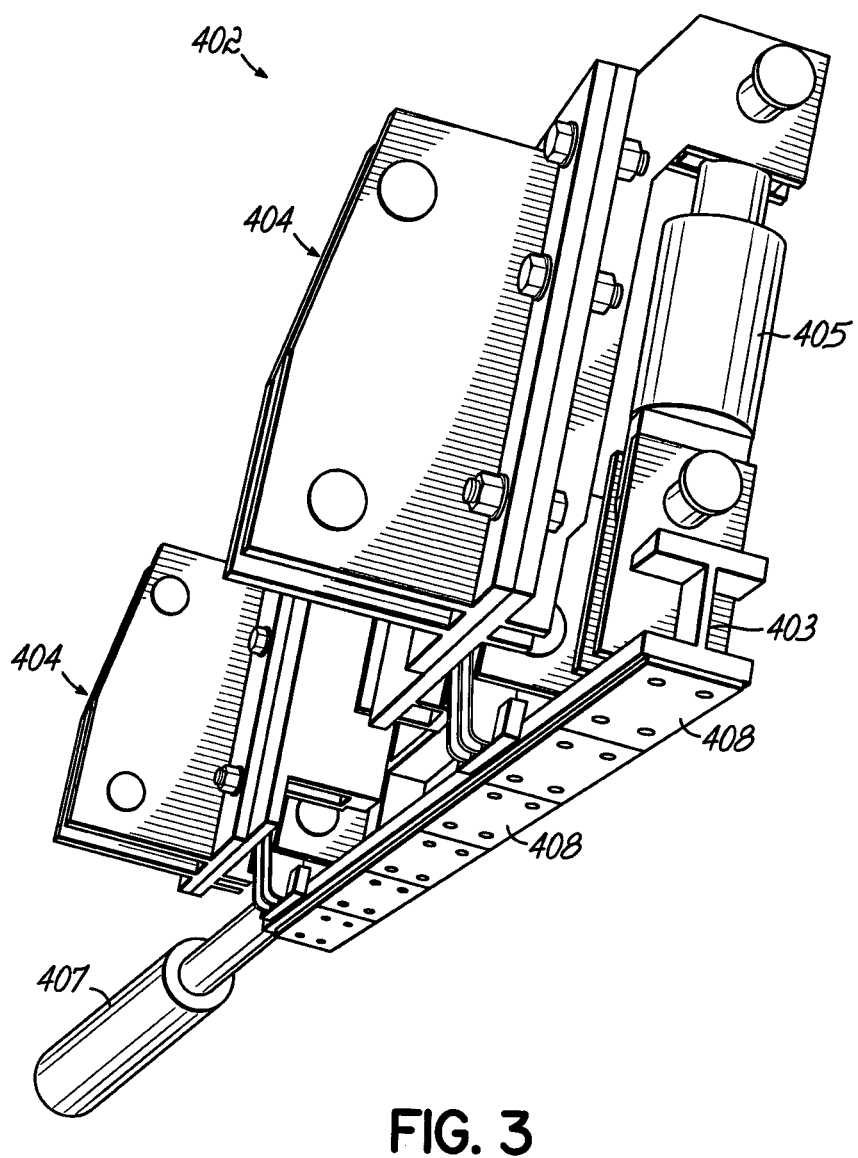
FIG. 3 is a perspective view from underneath of a portion of the tool in FIG. 2, FIG. 4a-FIG. 4c show schematic perspective views of actuators in the tool in FIG. 2.

As can be seen in FIG. 3, each sled 403 has on its surface facing the support unit 401 pads 408 in a low friction material, to facilitate a sliding motion of the sled 403 on the support unit 401. For connecting the transport assembly to the gearbox during a service or installation procedure, the interface portion 404 has flanges for connecting to cooperating flanges 202 (FIG. 2) on the gearbox 2 by means of pins through holes in the flanges.

The drive units 407 are here embodied as hydraulic actuators, and they connect the respective sled 403 to the nacelle structure, more particularly to the nacelle frame 56. Thus, when the gearbox 2 is released from the main shaft housing 57, the gearbox and generator assembly 1 can be moved along the x-axis by means of the sleds 403 and the drive units 407.

It should be noted that the drive units 407 can be embodied in different ways. For example, instead of hydraulic actuators, they could include long screws extending along the x-axis and engaging female threads in the sleds 403, which would move by twisting the screws.

Figure 4A:
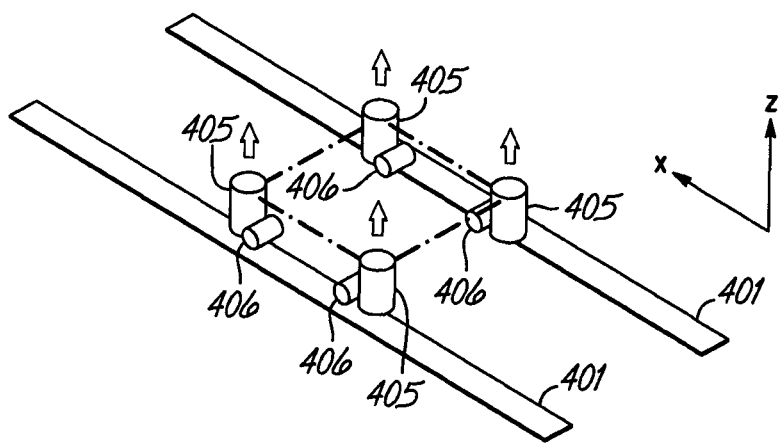
Figure 4B:
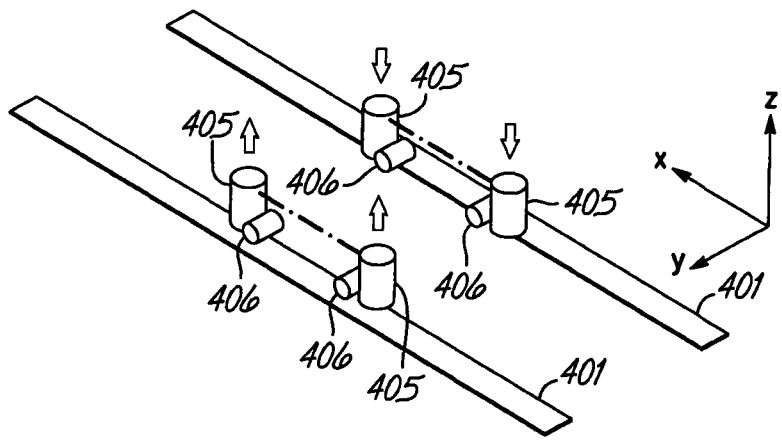
Figure 4C:
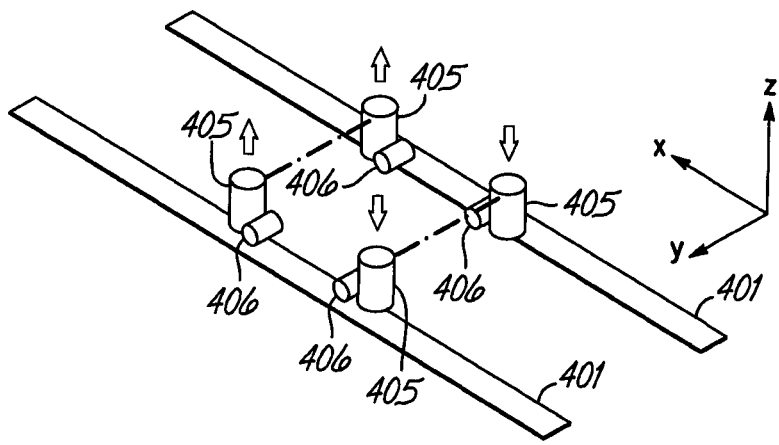

Reference is also made to FIG. 4a-FIG. 4c. On each transport assembly 402, the position adjustment devices 405, 406, here embodied as hydraulic actuators, are distributed along the x-axis. As can be seen in FIG. 4a, height adjustment, i.e. movement along the z-axis, of the component 1 can be accomplished by simultaneous movement in the same direction of all four first position adjustment devices 405. Each first position adjustment device 405 is a hydraulic linear actuator adapted to act between a first location on the sled 403 and a second location on the interface portion 404, the second location being higher than the first location. It should be noted that the position adjustment devices 405, 406 can alternatively be provided as some other type of actuators, e.g. electric linear actuators, or screw type linear actuators.

As can be seen in FIG. 4b, the rotational position of the component in relation to the x-axis can be controlled by actuating the first position adjustment devices 405 on a first side of the component simultaneously and in the same direction, and keeping the first position adjustment devices 405 on a second side of the component still, or actuating them differently to the first position adjustment devices 405 on the first side of the component. For example the first position adjustment devices 405 on the second side of the component can be actuated in a direction that is opposite to the direction of the actuation of the first position adjustment devices 405 on the first side of the component. Thereby, the rotational position of the component in relation to the x-axis can be changed. I.e. as seen in a direction parallel to the rotor rotational axis, the component can be tilted.

As can be seen in FIG. 4c, the rotational position of the component in relation to the y-axis can be controlled by actuating the first position adjustment devices 405 at a first position along the x-axis simultaneously and in the same direction, and keeping the first position adjustment devices 405 at a second position along the x-axis, different from the first position, still, or actuating them differently to the first position adjustment devices 405 at the first position along the x-axis. For example the first position adjustment devices 405 at the second position along the x-axis can be actuated in a direction that is opposite to the direction of the actuation of the first position adjustment devices 405 at the first position along the x-axis. Thereby, the rotational position of the component in relation to the y-axis can be changed; in other words the attitude of the component can be changed.

It should be noted that the tool 4 could alternatively comprise only one supporting unit 401 mounted underneath the component 1, and only one transport assembly 402, Thereby the first position adjustment devices 405 can be distributed along the x-axis, so that the attitude of the component can be changed.

Figure 5:
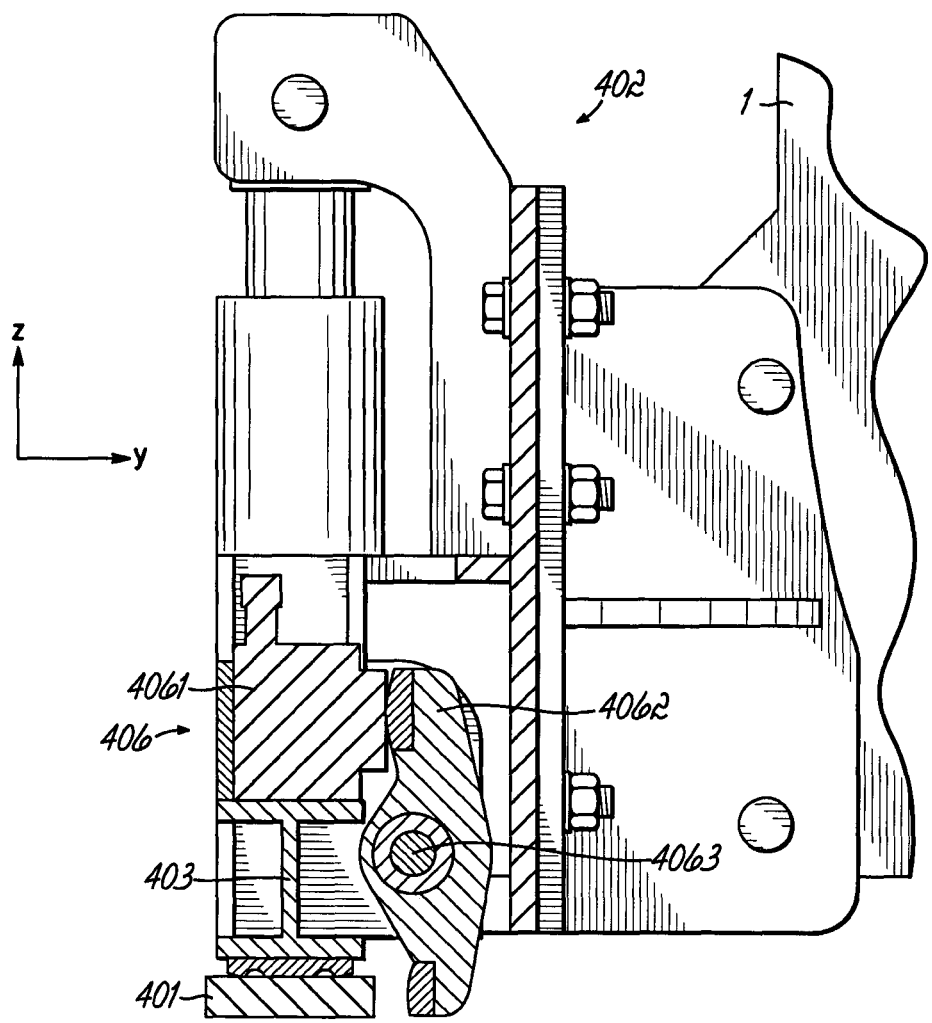
FIG. 5 shows an end view of a portion of the tool in FIG. 2, and FIG. 6a-FIG. 6c show schematic perspective views of actuators in the tool in FIG. 2.

Reference is made to FIG. 5. The second position adjustment devices 406 are each adapted to provide a force between the component and the nacelle structure, which force is parallel to the plane defined by the x-axis and the y-axis. Each of the second position adjustment devices 406 comprises a hydraulic actuator 4061 and a lever arm 4062 rotatably mounted, at an articulated joint 4063, to the sled 403. The hydraulic actuator 4061 is adapted to push an upper end of the lever arm 4062 in the direction of the y-axis so a lower end of the lever arm 4062 below the joint 4063 contacts and pushes against the support unit 401, thereby urging the transport assembly 402 and the component 1 in the direction of the y-axis, i.e. laterally. During the resulting movement, the sleds 403 slide laterally on the support units 401.

Figure 6A:
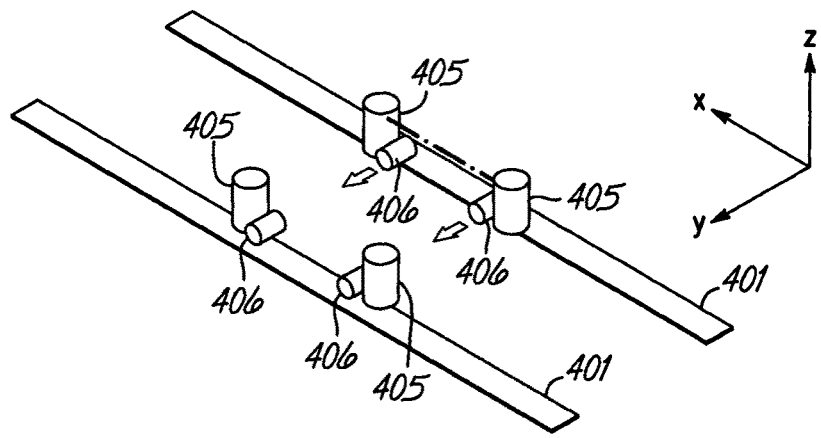

Reference is made to FIG. 6a, showing how the second position adjustment devices 406 are used to control the lateral position of the component. By extending simultaneously the hydraulic actuators 4061 of the second position adjustment devices 406 on the first side of the component 1, and keeping the hydraulic actuators 4061 of the second position adjustment devices 406 on the second side of the component 1 retracted, the component is moved along the y-axis.

Figure 6B:
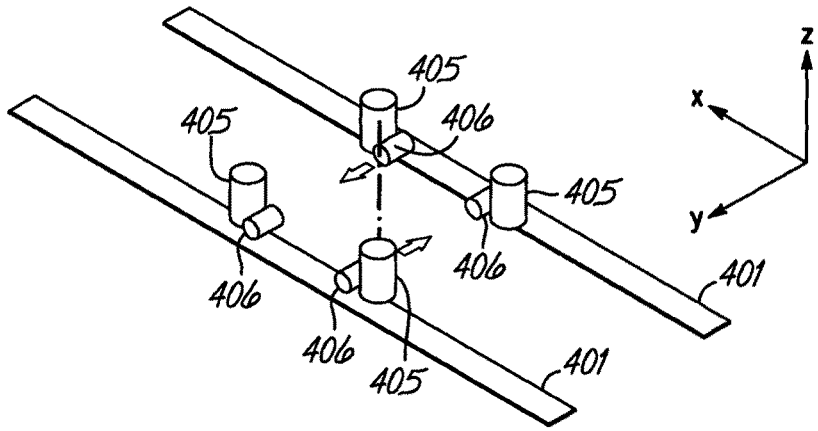
Figure 6C:
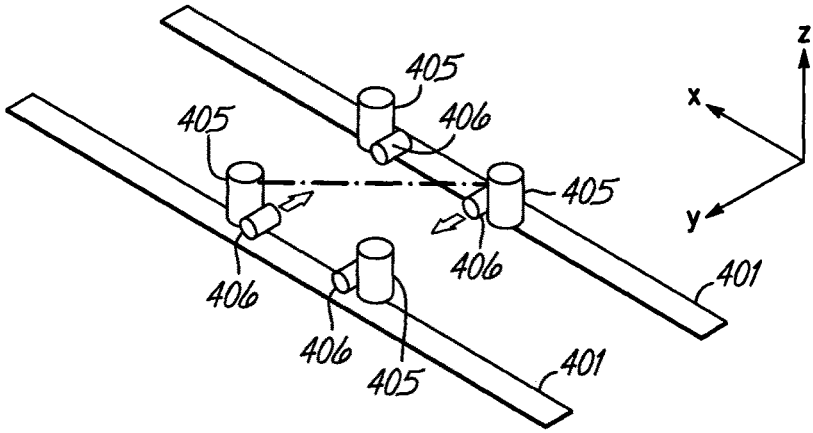

Reference is made to FIG. 6b and FIG. 6c, showing how the second position adjustment devices 406 are used to control the rotational position of the component 1 in relation to the z-axis. By extending the hydraulic actuators 4061 of diagonally oppositely located second position adjustment devices 406, and keeping the hydraulic actuators 4061 of the remaining second position adjustment devices 406 retracted, the component is caused to rotate around the z-axis.

It should be noted that the position adjustment devices 405, 406 can be embodied in different ways. For example, instead of hydraulic actuators, they could include screws engaging female threads so as to cause movement by twisting the screws.

In the embodiment described above the first position adjustment devices 405 act between two other parts of the transport assembly 402, namely the sled 403 and the interface portion 404, and the second position adjustment devices 406 act between the transport assembly 402 and the support unit 401. Alternatives are of course possible for the arrangement of the position adjustment devices 405, 406. For example they could act between the transport arrangement 402 and the component 1, between the transport arrangement 402 and the nacelle structure 56, or even directly between the component 1 and the nacelle structure 56.

Although the example above shows manipulation of an assembly of the gearbox and the generator, of course the invention can also be used to handle only the gearbox, only the generator, or some other drivetrain component such as the mainshaft.

The invention claimed is:

1. A horizontal axis wind turbine, comprising:
   a nacelle including a nacelle structure;
   a rotor defining a rotational axis;
   a drivetrain component connected to the rotor; and
   a tool for moving the drivetrain component in the nacelle, the tool including:
      at least one drive unit for moving the component in relation to the nacelle in a direction parallel to the rotational axis of the rotor, wherein the at least one drive unit generates a motive force that causes the movement of the component in relation to the nacelle, and a plurality of position adjustment devices adapted to be located between the nacelle structure and the component, and distributed so that rotational movement of the component can be provided by coordinated control of the position adjustment devices, wherein at least one of the position adjustment devices is arranged below an uppermost aspect of the component.

2. The wind turbine according to claim 1, wherein, in a space defined by an x-axis that is parallel to the rotational axis of the rotor, a y-axis that is horizontal and perpendicular to the x-axis, and a z-axis that is perpendicular to the x-axis and to the y-axis, for control of the rotational position around an axis that is parallel to the y-axis, at least two of the position adjustment devices are distributed in a plane that is parallel to the plane defined by the x and z axes.

3. The wind turbine according to claim 1, wherein at least two of the position adjustment devices are distributed in a direction parallel to the rotational axis of the rotor so that the attitude of the component in relation to the nacelle can be controlled by means of said at least two position adjustment devices.

4. The wind turbine according to claim 1, wherein, in a space defined by an x-axis that is parallel to the rotational axis of the rotor, a y-axis that is horizontal and perpendicular to the x-axis, and a z-axis that is perpendicular to the x-axis and to the y-axis, for the control of the rotational position of the component around an axis that is parallel to the x-axis, at least two of the position adjustment devices are distributed in a plane that is parallel to the plane defined by the y and z axes.

5. The wind turbine according to claim 1, wherein at least two of the position adjustment devices are distributed in a direction parallel to an axis that is horizontal and perpendicular to the rotor rotational axis, so that the rotational position of the component around an axis that is parallel to the rotational axis of the rotor can be controlled by means of the position adjustment devices.

6. The wind turbine according to claim 1, wherein the position adjustment devices comprise a plurality of first position adjustment devices adapted to act between a respective first location on the nacelle structure or on an intermediate part, and a respective second location on the component or on an interface portion positioned between the component and the respective first position adjustment device, the second location being higher than the first location.

7. The wind turbine according to claim 6, wherein the first position adjustment devices are linear actuators.

8. The wind turbine according to claim 1, wherein the position adjustment devices comprises a plurality of first position adjustment devices each arranged to be subjected to a compression force when carrying at least a part of the weight of the component.

9. The wind turbine according to claim 1, wherein the tool includes at least one transport assembly including at least one of said at least one drive unit, and at least two of said position adjustment devices.

10. The wind turbine according to claim 9, wherein the transport assembly comprises a sled to which at least one of the at least one drive unit is connected, which sled is adapted to slide on the nacelle structure or a part adapted to be fixed to the nacelle structure.

11. The wind turbine according to claim 1, wherein the tool includes two transport assemblies each comprising a drive unit, the transport assemblies being distributed along a horizontal axis that is perpendicular to the rotor rotational axis and located on either side of the component, two position adjustment devices being located on each transport assembly and are distributed along the rotor rotational axis.

12. A tool for moving a drivetrain component in a nacelle of a horizontal axis wind turbine, the nacelle comprising a nacelle structure, the component being connected, in operation of the wind turbine, to a rotor of the wind turbine, the tool comprising:
at least one drive unit for moving the component in relation to the nacelle in a direction parallel to the rotational axis of the rotor, wherein the at least one drive unit generates a motive force that causes the movement of the component in relation to the nacelle, and
a plurality of position adjustment devices adapted to be located between the nacelle structure and the component, and distributed so that rotational movement of the component can be provided by coordinated control of the position adjustment devices,
wherein at least two of the position adjustment devices are second position adjustment devices and wherein, in a space defined by an x-axis that is parallel to the rotational axis of the rotor, a y-axis that is horizontal and perpendicular to the x-axis, and a z-axis that is perpendicular to the x-axis and to the y-axis, the second position adjustment devices are distributed in a plane that is parallel to the plane defined by the x and y axes so that the rotational position of the component in relation to the nacelle and about the z-axis can be controlled by means of the second position adjustment devices.

13. The tool according to claim 12, wherein there are at least four second position adjustment devices, located in pairs distributed along the y-axis and on either side of the component, and where the second position adjustment devices of each pair are distributed along the x-axis.

14. The tool according to claim 13, wherein the second position adjustment devices are each adapted to provide a force between the component and the nacelle structure, which force is parallel to, or has a component in, the plane defined by the x-axis and the y-axis.

15. A horizontal axis wind turbine, comprising:
a nacelle including a nacelle structure;
a rotor defining a rotational axis;
a drivetrain component connected to the rotor; and
a tool for moving the drivetrain component in the nacelle, the tool including:
at least one drive unit for moving the component in relation to the nacelle in a direction parallel to the rotational axis of the rotor, wherein the at least one drive unit generates a motive force that causes the movement of the component in relation to the nacelle, and
a plurality of position adjustment devices adapted to be located between the nacelle structure and the component, and distributed so that rotational movement of the component can be provided by coordinated control of the position adjustment devices, wherein at least one of the position adjustment devices includes at least one of a hydraulic actuator, an electric linear actuator, or a screw type linear actuator.

* * * * *